(12) United States Patent
Fukuda et al.

(10) Patent No.: US 8,212,447 B2
(45) Date of Patent: Jul. 3, 2012

(54) MAGNET EMBEDDED ROTOR, ELECTRIC MOTOR USING THE SAME ROTOR, AND COMPRESSOR USING THE SAME MOTOR

(75) Inventors: Yoshichika Fukuda, Kanagawa-ken (JP); Pairoj Patisonticharoen, Kanagawa-ken (JP); Yuusuke Kikuchi, Kanagawa-ken (JP); Hiroki Nakagawara, Kangawa-ken (JP)

(73) Assignee: Fujitsu General Limited, Kanagawa-ken (JP)

( * ) Notice: Subject to any disclaimer, the term of this patent is extended or adjusted under 35 U.S.C. 154(b) by 746 days.

(21) Appl. No.: 12/226,567

(22) PCT Filed: Apr. 11, 2007

(86) PCT No.: PCT/JP2007/057972
§ 371 (c)(1),
(2), (4) Date: Oct. 21, 2008

(87) PCT Pub. No.: WO2007/125753
PCT Pub. Date: Nov. 8, 2007

(65) Prior Publication Data
US 2010/0166575 A1  Jul. 1, 2010

(30) Foreign Application Priority Data

Apr. 24, 2006 (JP) .................................. 2006-118640

(51) Int. Cl.
*H02K 21/12* (2006.01)

(52) U.S. Cl. .................................................. 310/156.53
(58) Field of Classification Search ............. 310/156.53, 310/156.56; *H02K 1/27, 1/22*
See application file for complete search history.

(56) References Cited

U.S. PATENT DOCUMENTS

| | | | |
|---|---|---|---|
| 6,597,079 B2 * | 7/2003 | Miyashita et al. | 310/156.48 |
| 7,843,101 B2 * | 11/2010 | Ito et al. | 310/156.56 |
| 2010/0194228 A1 * | 8/2010 | Lee et al. | 310/156.53 |

FOREIGN PATENT DOCUMENTS

| | | |
|---|---|---|
| JP | 10-094201 | 4/1998 |
| JP | 2000-217287 | 8/2000 |
| JP | 2002-223538 | 8/2002 |
| JP | 2003-037955 | 2/2003 |
| JP | 2005-354798 | 12/2005 |
| JP | 4135018 | 6/2008 |

* cited by examiner

*Primary Examiner* — Nguyen N Hanh
(74) *Attorney, Agent, or Firm* — Jordan and Hamburg LLP

(57) ABSTRACT

A magnet embedded rotor is provided in which permanent magnets are embedded in the iron core of the rotor at a fixed interval. Notch parts are formed at the first protruding part and both the sides of the first protruding parts on the outer face between salient poles in the iron core of the rotor correspond to the multiple permanent magnets. Non-magnetic parts for preventing the short circuit of magnetic flux are formed at both the edges of the permanent magnets. A bridge part between the non-magnetic parts and the notch parts are narrowed as much as possible to an extent to cause a magnetic saturation, and one or multiple of the second protruding part extending to the direction of the outer face are formed at the notch parts.

4 Claims, 10 Drawing Sheets

| Structure of Roter | [Fig.5] 57.0° | [Fig.6] 48.0° | [Fig.7] 40.0° | [Fig.8] 44.0° | [Fig.1] 44.0° |
|---|---|---|---|---|---|
| Calking Torque (N/m) | 0.205 | 0.235 | 0.182 | 0.179 | 0.097 |
| Output Torque (N/m) | 8.94 | 8.62 | 8.56 | 8.67 | 8.54 |
| Voltage Wave Form | △ | ○ | ○ | ○ | ◎ |
| Torque Ripple (%) | 33.33 | 17.49 | 18.61 | 18.8 | 20.15 |

| Structure of Roter (V-letter) | [Fig.4] (a) | [Fig.4] (b) | [Fig.4] (c) |
|---|---|---|---|
| Number of rotrudings | 2 | 1 | 1 (Smooth) |
| Calking Torque (N/m) | 0.135 | 0.103 | 0.066 |
| Torque Ripple (%) | 14.35 | 15.42 | 15.26 |

Fig. 12

PRIOR ART

MAGNET EMBEDDED ROTOR, ELECTRIC MOTOR USING THE SAME ROTOR, AND COMPRESSOR USING THE SAME MOTOR

FIELD OF THE INVENTION

The present invention relates to a magnet embedded rotor in which permanent magnets are embedded in the iron core of the rotor and an electric motor using the rotor in electric motors and generators used for consumer products, industrial equipments and others.

BACKGROUND OF THE INVENTION

Figure 12:
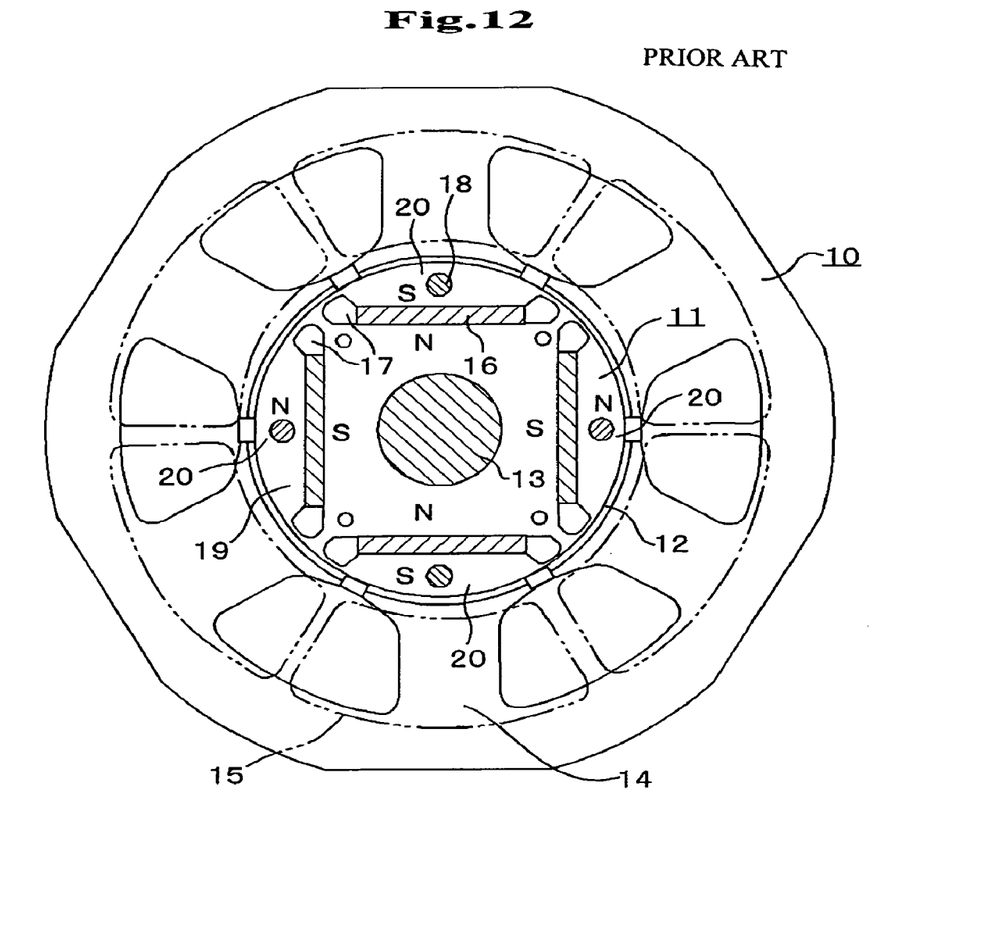
FIG. 12 shows a descriptive figure of general electric motors using magnet embedded rotors.

As shown in FIG. 12, a known electric motor using this type of magnet embedded rotor has a rotor 11 and a void part 12 inside a stator 10. The rotor 11 comprises four permanent magnets 16 embedded in the form of a square approximately in the iron core 19 of the rotor in which multiple silicon steel plates are laminated and fixed with rivets 18, a rotation axis 13 mounted at the center, and non-magnetic parts 17 at the bilateral edges of each permanent magnet 16 including voids for preventing flux short circuit and others. The parts of the iron core of the rotor facing the outer side of each permanent magnet 16 comprise salient poles 20.

The stator 10 comprises six stator cogs formed at the interval of 60° and three-phase stator winding 15 which winds each stator cog 14.

Figure 15:
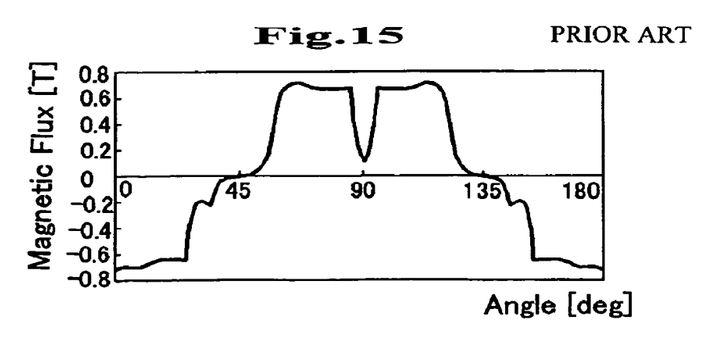
FIG. 15 shows a figure of the magnet embedded rotor shown in FIG. 12.

The magnetic flux density distribution of an electric motor using the rotor 11 with a form as shown in FIG. 12 demonstrates properties close to those of rectangular waves as shown in FIG. 15. Components of higher harmonics are contained with a large quantity, so that the iron loss occurring at the rotation of the electric motor becomes so large that the efficiency decreases.

Figure 13:
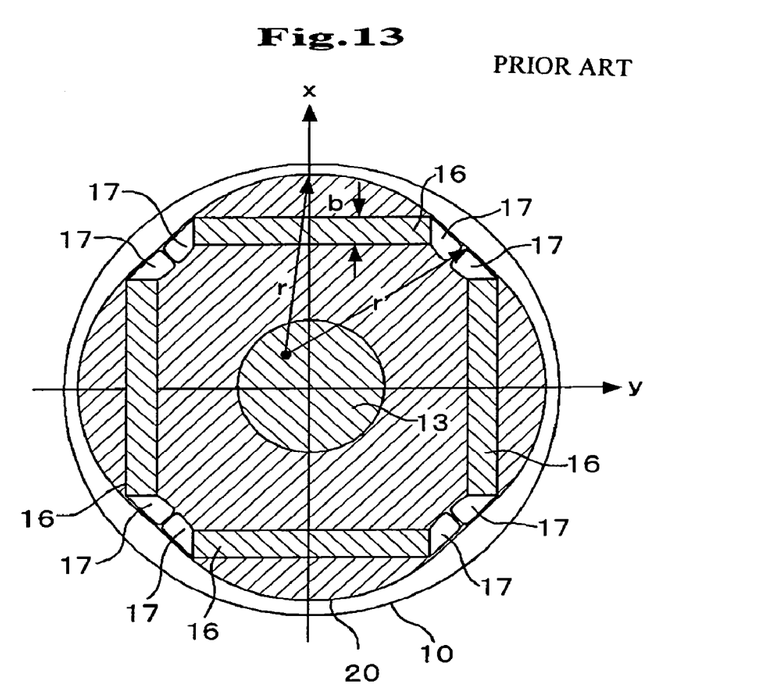
FIG. 13 shows a descriptive figure of known magnet embedded rotors.

Thus, to improve this condition, an electric motor with a rotor structure as shown in FIG. 13 is proposed (Patent reference 1).

Figure 14:
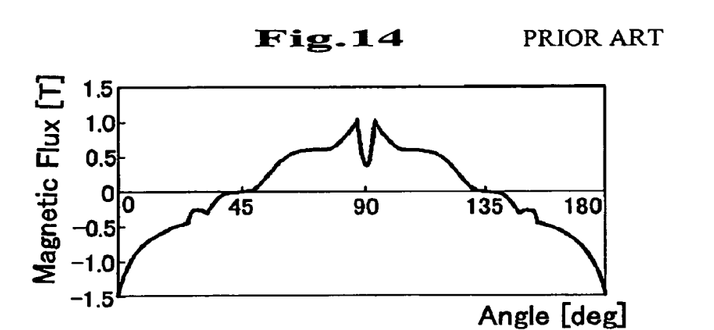
FIG. 14 shows a figure of properties of the magnet embedded rotor shown in FIG. 13.

As shown in FIG. 13, the rotor structure is with the central point of a smaller radius r than the original radius of the iron core 19 of the rotor which is shifted from the central point of the rotor 11 in such a manner that the length of the void part increases gradually over a range from the central part of salient pole 20 to the non-magnetic part 17 on an outer face 24 of the iron core 19 of the rotor. According to the patent reference 1, the magnetic flux density distribution is to show properties close to those of sine waves by reducing the components of higher harmonics to decrease the iron loss, as shown in FIG. 14.

Figure 16:
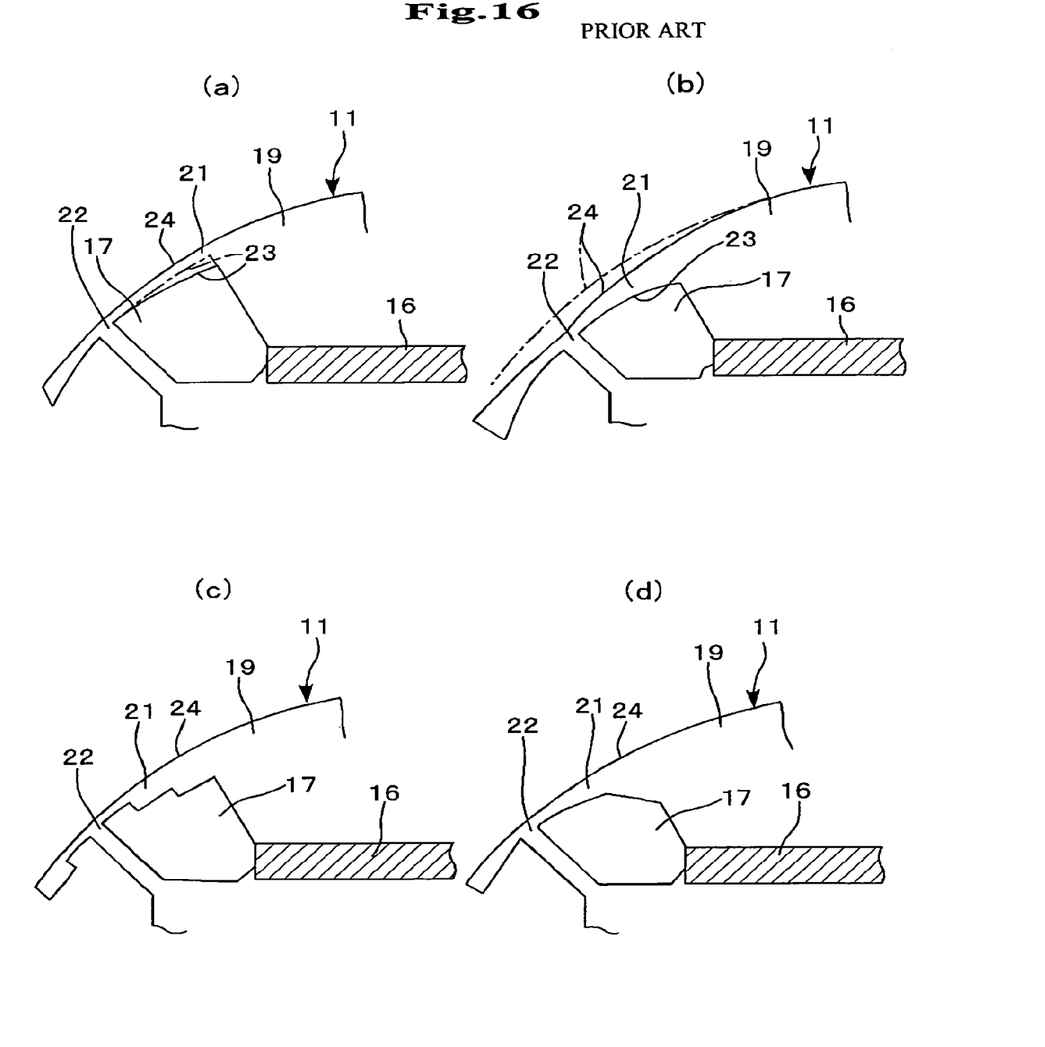

As electric motors in which the torque ripple is made small to decrease vibration/noise, those shown in FIG. 16 are known (Patent reference 2).

Generally, because the iron core 19 of the rotor is not divided between the edge of the permanent magnet 16 and the outer face 24 of the iron core 19 of the rotor, the connection is made with a long and slender bridge part 21. However, in the first embodiment as shown in FIG. 16 (a), an inner face 23 of the non-magnetic part 17 is changed from the chain line's to the solid line's in such a manner that the width of the bridge part 21 becomes narrower gradually over a range from the salient pole side 20 to a reinforced rib part 22 in adjacent two non-magnetic parts 17.

In the second embodiment as shown in FIG. 16 (b), the outer face 24 of the iron core 19 of the rotor is notched as it is from the chain line's to the solid line's to make the width of the notch different.

In the third embodiment as shown in FIG. 16 (c), an inner face 23 of the non-magnetic part 17 is notched in a step-wise manner.

In the fourth embodiment as shown in FIG. 16 (d), the inner face 23 of the non-magnetic part 17 is notched in a polygonal manner.

It is stated that such structures enables to reduce the torque ripple and then vibration and noise.

In electric motors in which the width of the bridge part 21 is changed gradually as the embodiments described above, there was a problem that the magnetic flux of the permanent magnet 16 is dispersed. In the form of the rotor 11 as shown in FIGS. 13 and 16, the non-magnetic parts 17 are mounted at the bilateral edges of the permanent magnet 16. However, a leaked magnetic flux occurs at the adjacent salient pole 20 though the facing stator 10 from the non-magnetic part 17 and this leaked magnetic flux increases the calking torque and consequently increases noise, which was a problem. Thus, it was difficult to realize an induced voltage with a high peak level and less components of higher harmonics.

Figure 5:
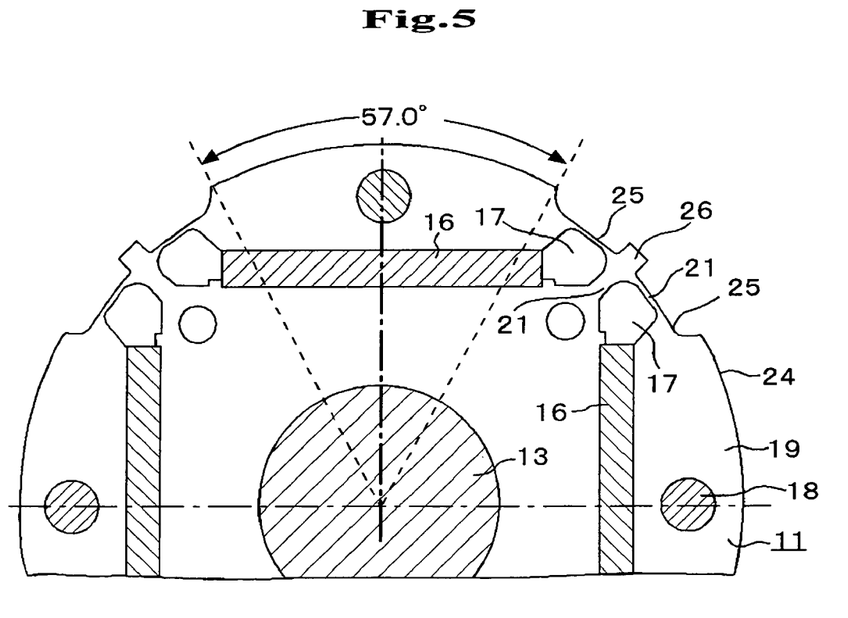
FIG. 5 shows a partially enlarged view of the rotor 11 for comparison wherein the sharp notch part 25 is installed, the first protruding part 26 is formed, and the central angle θ of the radius R is made 57.0°.

To solve such problems, the present applicant proposed an electric motor in which a sharp notch 25 is installed to concentrate the magnetic flux density and a protruding portion is formed by extending the bridge 21 between adjacent non-magnetic parts 26 to the outer face 24, as shown in FIG. 5 (Patent reference 3).

Patent reference 1: Japanese Patent Provisional Publication No. 2003-37955

Patent reference 2: Japanese Patent Provisional Publication No. 2000-217287

Patent reference 3: Japanese Patent provisional Publication No. 2005-354798

DISCLOSURE OF THE INVENTION

[Problems to be Solved by the Invention]

The electric motor as shown in the patent reference 3 intends to increase the output torque of the motor and decrease the calking torque. However, when the sharp notch 25 was installed, the variation in the magnetic flux density was still so high that fifth components of higher harmonics appeared on induced voltage waves, which became some problem.

The object of the present invention is to provide a magnet embedded rotor which decreases the calking torque and vibration and noise (torque ripple) without decreasing generated torque as much as possible and the electric motor with said rotor.

[Means for Solving Problems]

The magnet embedded rotor in the present invention is characterized in that permanent magnets are embedded in the iron core of the rotor in a fixed interval, that the first protruding portion and notch part are formed on the outer face between the salient poles in the iron core of the rotor corresponding to the multiple permanent magnets, that the non-magnetic parts for preventing the short circuit of magnetic flux at the bilateral edges of the permanent magnets, that the bridge part between the non-magnetic part and the notch part is narrowed to an extent to cause a magnetic saturation, and that the second protruding portion extending to the direction of the outer face is formed at the notch part.

Said notch part is characterized to be formed in such a manner that it changes gradually over a range from the outer face of the salient pole to the first protruding portion.

The notch part is also characterized in that the central angle between the inflection points starting the bilateral notch parts on the outer face of said salient poles is set at 40~48°.

The notch part is also characterized in that the second multiple protruding portions are formed with different heights at a certain interval and the distances between the stator and voids. It is also characterized in that the permanent magnets are formed rectilinearly.

[Effects of the Invention]

The magnet embedded rotor in which the permanent magnets are embedded in the iron core of the rotor at a fixed interval comprises the notch part and the first protruding part formed on the outer face between the salient poles in said iron core of the rotor corresponding to said multiple permanent magnets, the non-magnetic part for preventing the short circuit of magnetic flux formed at the bilateral edges of said permanent magnets, the bridge part between the non-magnetic part and the notch part which is narrowed to an extent to cause a magnetic saturation, and the second protruding part extending to the direction of the outer face formed at said notch part. Consequently, it is possible to increase the output torque of the electric motor and reduce the calking torque and moreover, vibration and noise (torque ripple). Thus, the output waves closer to sine waves can be produced.

According to some embodiments of the invention, the notch part is formed in such a manner that it changes gradually over a range from the outer face of the salient pole to the first protruding part enabling a decrease in the variation in the magnetic flux density and components of higher harmonics to appear on induced voltage waves.

According to some embodiments of the invention, the central angle between the inflection points at which the bilateral notch part on the outer face of the salient pole is set at 40-48°, which allows the top of the wave to become closer to sine wave.

According to some embodiments of the invention, the multiple second protruding parts are formed with different heights at a fixed interval and the distances with the stator and with void part are made different. Consequently, the waves at both sides expand so more than the tops of the waves that the waves can be closer to sine waves.

According to some embodiments of the invention, the permanent magnets are formed in a V-letter shape expanding to the outer direction, which enables reduction of the torque ripple as the output is increased.

According to some embodiments of the invention, the electric motor installs the stator and the rotor and utilizes the magnet embedded rotor wherein the permanent magnets are embedded in the iron core of said rotor in a fixed interval. Said stator is a concentrated winding stator wherein each stator winding winds intensively at the multiple stator cogs extending from the stator yoke to the center at a fixed interval. Said rotor comprises the notch parts at the first protruding part and both sides of the first protruding part on the outer face between the salient poles corresponding to said multiple magnets, the non-magnetic part for preventing the short circuit of the magnetic flux at both the edges of said permanent magnets, and the second protruding part at said notch part which extends to the direction of the outer face and wherein the bridge part between the non-magnetic part and said notch part is narrowed to an extent to cause a magnetic saturation. Consequently, when the electric motor is used for consumer products and industrial equipments, the output torque of the motor can be increased and moreover, the calking torque and vibration/noise (torque ripple) can be decreased.

According to some embodiments of the invention, a compression compartment is arranged inside a sealed container and the electric motor provides a driving force which compresses refrigerant gas aspirated from an inlet in the compression compartment causing exhalation. Consequently, the compressor output can be increased and the calking torque and vibration I noise (torque ripple) can be decreased.

BRIEF DESCRIPTION OF THE DRAWINGS

FIG. 4 The (a), (b) and (c) in FIG. 4 are partially enlarged views of difference examples of the second protruding part at the rotor 11 in Embodiment 2 of the present invention.

Fig. 16 the (a), (b), (c) and (d) in FIG. 16 show a descriptive figure of other known magnet embedded rotors.

DESCRIPTION OF REFERENCE NUMERALS

10... Stator, 11... Rotor, 12... Void part, 13... Rotation axis, 14... Stator cog, 15... Stator winding, 16... Permanent magnet, 17... Non-magnetic part, 18... Rivet, 19... Iron core of rotor, 20... Salient pole part, 21... Bridge part, 22... Reinforced rib part, 23... Inner face, 24... Outer face, 25... Notch part, 26... The first protruding part, 27... The second protruding part, 28... Stopper, 29... Stator yoke part.

[Best Mode To Execute The Invention]

The rotor comprises the iron core of the rotor in which multiple silicon steel plates are laminated, four permanent magnets, the central rotation axis, and rivets for fixing four sites near the outer face.

Said iron core of the rotor has a fixed radius basically. Said permanent magnets has a size of the long hand x the short hand and are embedded at a certain distance in parallel to the axes X and Y passing through the central point. The outer face side corresponding to the long hand face of these permanent magnets comprises the salient poles. The non-magnetic parts including the voids for preventing the short circuit of the magnetic flux is formed at both the edges of the permanent magnets and the reinforced rib part is made between the adjacent non-magnetic parts. The first protruding part is formed at the outer face side of the iron core of the rotor continuing to the reinforced rib part. The outer face parts at both the sides of the first protruding part becomes the notch part, wherein the one or multiple second protruding part specific for the present invention are formed.

[Embodiment 1]

Embodiments of the present invention are described below, based on the drawings.

Figure 1:
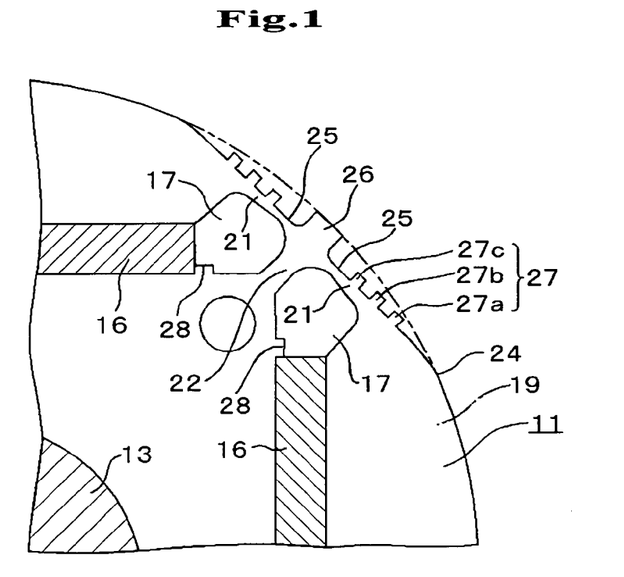
FIG. 1 shows a partially enlarged view of the rotor 11 in Embodiment 1 of the present invention.
Figure 2:
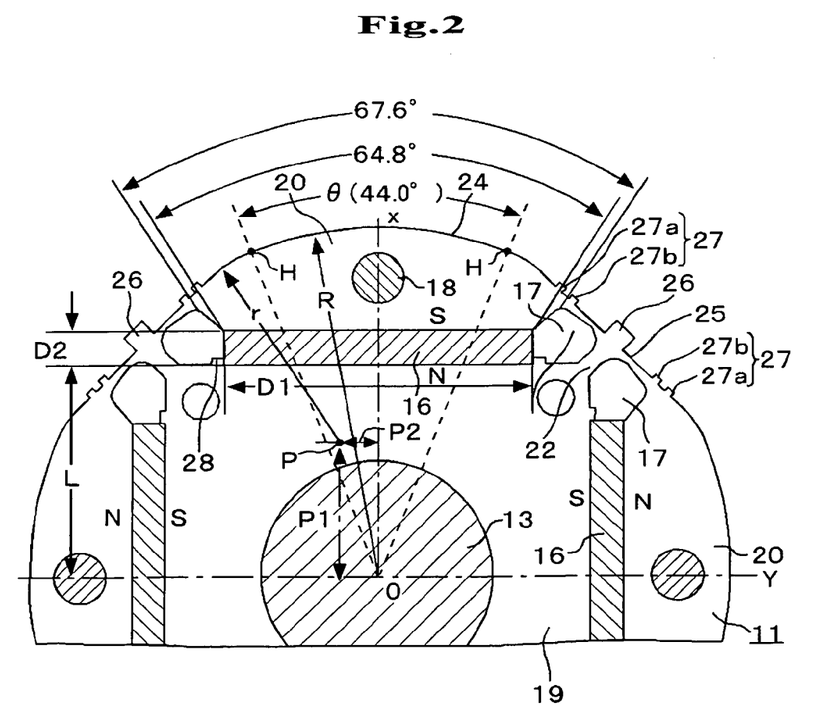
FIG. 2 shows a partially enlarged view of specific dimensions of the rotor 11 in Embodiment 1 of the present invention.

In FIGS. 1 and 2, a rotor 11 comprises the iron core of the rotor in which multiple silicon steel plates are laminated, four permanent magnets 16, a rotation axis 13 at the center and rivets for fixation 18 at four sites near the outer face.

In iron core 19 of said rotor, said permanent magnets 16 are the long hand D1 (e.g. 26.5 mm)×the short hand D2 (e.g. 2.8 mm) in size with the radius R (e.g. 30.00 mm) and embedded at a distance L (e.g. 18.02 mm) in parallel to the axes X and Y passing through the central point 0. The salient poles comprise outer faces 24 corresponding to the long hands of the permanent magnets. At both the edges of these permanent magnets 16, non-magnetic parts 17 including the void for preventing the short circuit of the magnetic flux are formed and reinforced rib parts 22 are between the adjacent two non-magnetic parts 17. The first protruding part 26 is formed at the outer face 24 side of the iron core 19 of the rotor continuing to the reinforced rib part 22. The outer face 24 at both the sides of the first protruding part 26 becomes a notch part 25 wherein one or multiple of the second protruding parts 27 specific for the present invention is formed.

Stator comprises the same shown in FIG. 12. For example, the six stator cogs 14 are formed at the interval of 60° and a three-phase stator winding 15 winds intensively at each stator cog 14, which makes the stator a concentrated winding stator.

Said rotor 11 is described with concrete numerical values in more details. In said salient pole part 20, the central angle θ (e.g. 44°) centering the axial line is with the radius R=30.00 mm and the notch part 25 is formed with the H points at both the edges as inflection points and the radius r up to the first protruding part 26. The central point P of the radius r is made the point of P1 (e.g. 12.13 mm) from the axis X and P2 (e.g. 3.59 mm) from the axis Y. Consequently, the bridge part 21 between the non-magnetic part 17 and the notch part 25 is formed in such a manner that the width (e.g. about 0.5 mm or less) is narrowed as much as possible within a range which doesn't disturb the piercing processing of the iron core 19 of the rotor and the assembly processing of the stator 10 in order to cause a magnetic saturation and then prevent the magnetic flux to easily pass through.

As for said second protruding part 27 specific for the present invention, FIG. 1 shows an example in which the three second protruding parts, 27a, 27b and 27c, are formed and FIG. 2 shows an example with the two second protruding parts, 27a and 27b.

In the second protruding parts, 27a, 27b and 27c, the width is about 0.3~0.6 mm which is lower than the circumferential face before the tip part is notched. The effect to reduce the calking torque and vibration/noise (torque ripple), which are objects of the present invention, is the highest in sites near the salient poles and the degree of the effect is in the order of the second protruding part 27a >the second protruding part 27b >the second protruding part 27c.

Figure 9:
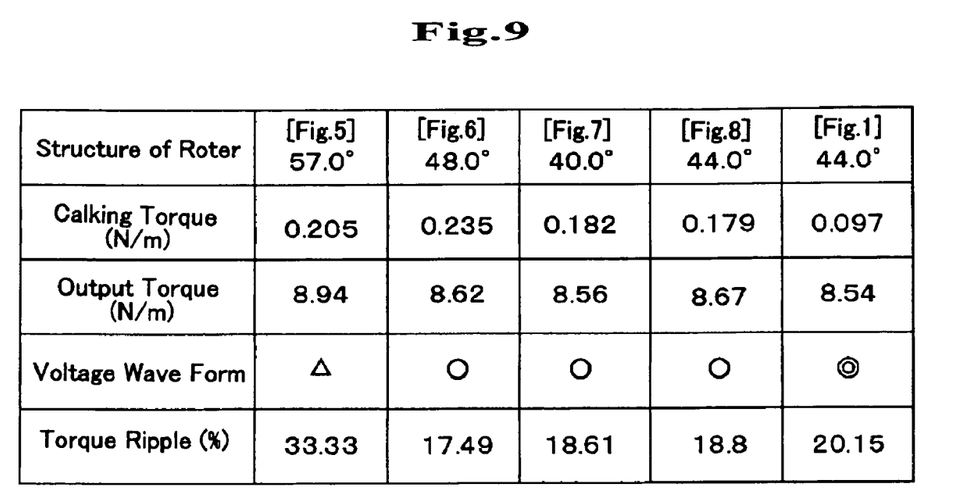
FIG. 9 shows a descriptive figure about comparison of properties between the rotor for comparison and the rotor 11 of Embodiment 1 with the invention.
Figure 10:
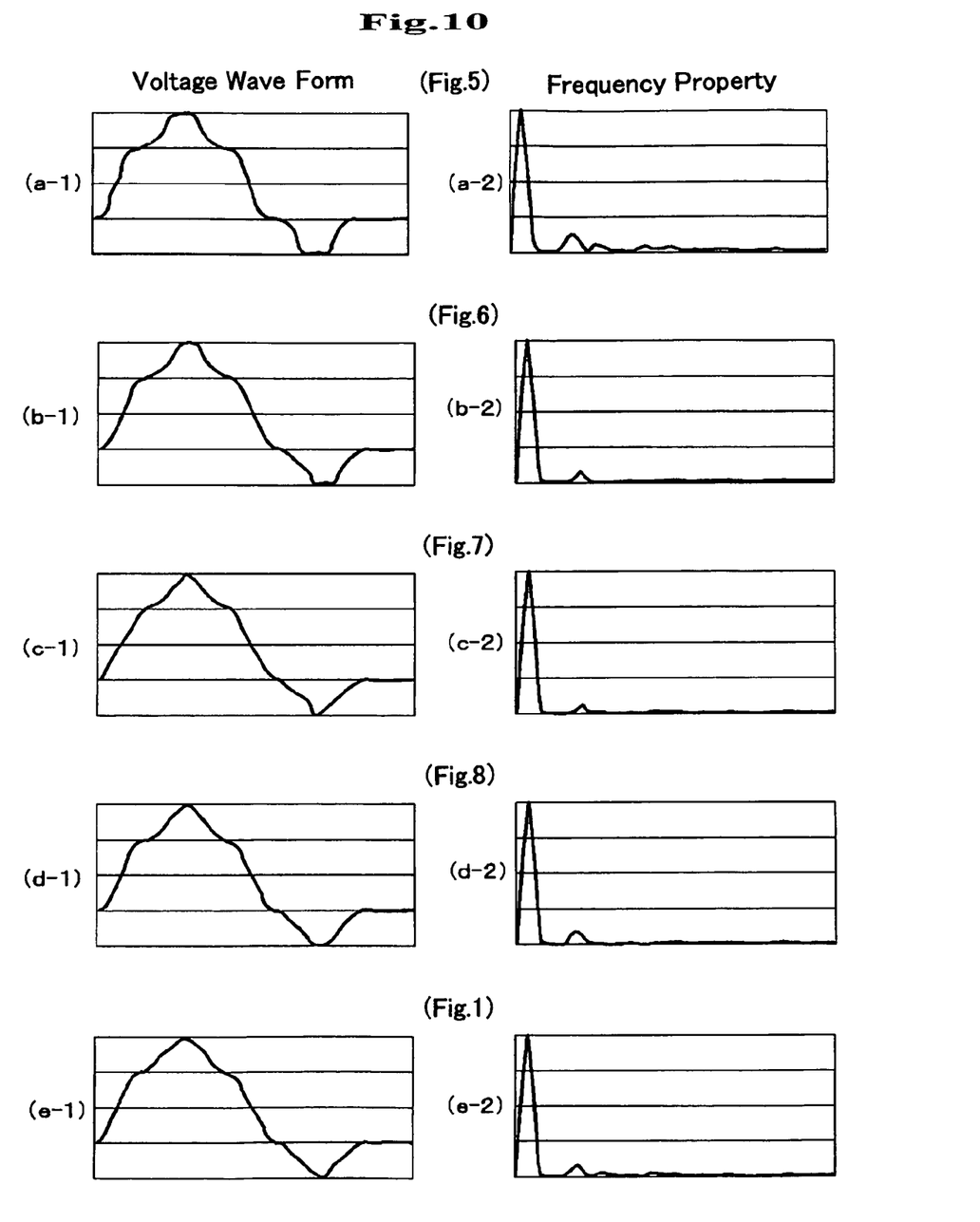
FIG. 10 shows a comparative figure of waves between the rotor 11 for comparison and the rotor 11 of Embodiment 2 with the present invention.

The experimental action and effect of the rotor 11 (FIGS. 1 and 2) in Embodiment 1 are described in FIGS. 9 and 10.

Figure 6:
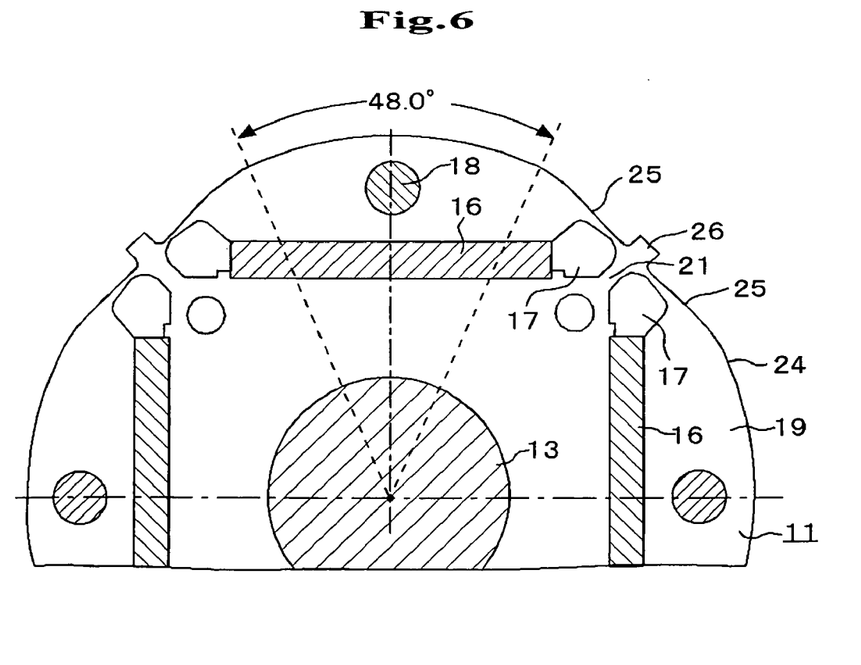
FIG. 6 shows a partially enlarged view of the rotor 11 for comparison wherein the notch part 25 changing gradually is installed, the first protruding part 26 is formed, and the central angle θ of the radius R is made 48.0°.
Figure 7:
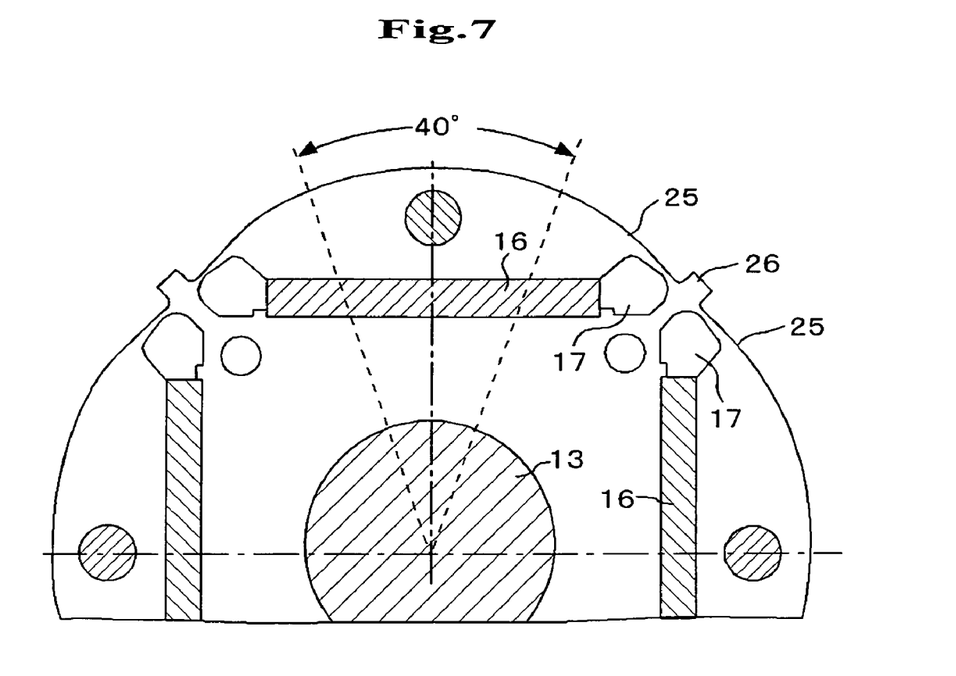
FIG. 7 shows a partially enlarged view of the rotor 11 for comparison wherein the notch part 25 changing gradually is installed, the first protruding part 26 is formed, and the central angle θ of the radius R is made 40.0°.
Figure 8:
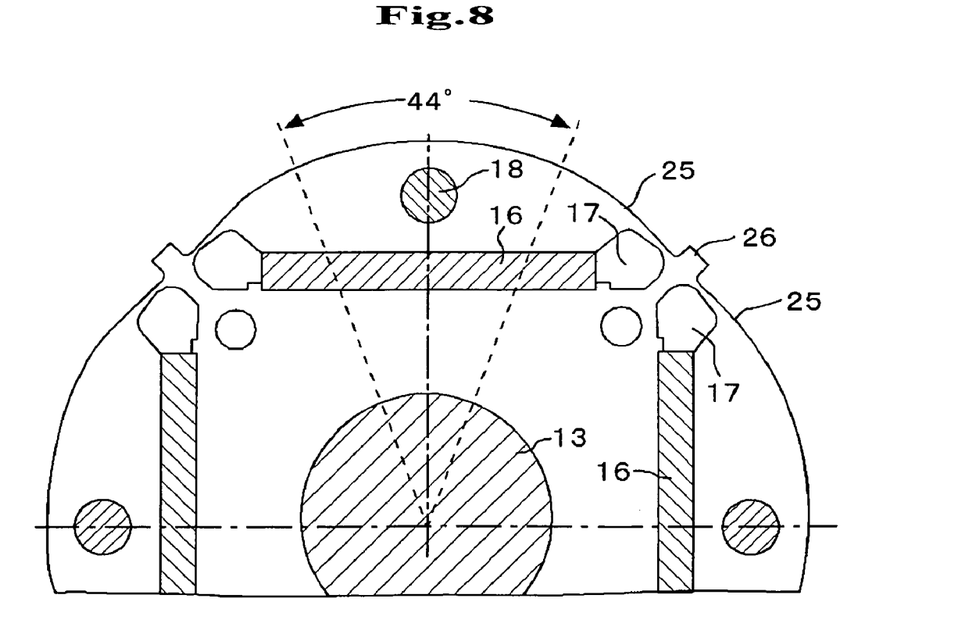
FIG. 8 shows a partially enlarged view of the rotor 11 for comparison wherein the notch part 25 changing gradually is installed, the first protruding part 26 is formed, and the central angle θ of the radius R is made 44.0°.

In FIG. 9, FIGS. 5, 6, 7, and 8 show the rotors 11 for comparison which don't have the second protruding part 27. That is, FIG. 5 shows the rotor in which a sharp notch part 25 is installed, the first protruding part 26 is formed, and the central angle θ of the radius R is made 57.0°; FIG. 6 shows the rotor in which the notch part 25 changing gradually is installed, the first protruding part 26 is formed and the central angle θ of the radius R is made 48.0°; FIG. 7 shows the rotor comprising the notch part 25 changing gradually and the first protruding part 26 and having the central angle θ of the radius R of 40.0°; and FIG. 8 shows the rotor comprising the notch part 25 changing gradually and the first protruding part 26 and having the central angle θ of the radius R of 44.0°.

FIG. 9 shows the comparison among the five embodiments.

The calking torque in the rotor with the second protruding part of the present invention shown in FIG. 1 decreases to about ½, compared with the rotor without the second protruding part 27.

The output torque is slightly less in the rotor 11 with the second protruding part 27 than the other rotors, although the difference is almost absent.

FIG. 10 shows the induced voltage waves and frequency property. The figure of the induced voltage waves reveals that the top part of the wave becomes flat with the large central angle θ and becomes pointed with the small angle θ, and that the optimal angle is 40~48° and more preferably about 44°. In the embodiment without the second protruding part 27 shown in FIGS. 5, 6, 7, and 8, after the waves rise and fall sharply at both the sides of the top part, the waves become horizontal and then rise and fall sharply, causing a convexo concave condition. On the other hand, the waves produced in the embodiment with the second protruding part 27 in FIG. 1 rise and fall gently, being very close to sine waves.

As for torque ripple, as shown in the figure of the frequency property, the embodiment in FIG. 5 has the 5th, 7th, 11th and 13th higher harmonics, the most. The embodiment in FIG. 1 is slightly inferior to the embodiments in FIGS. 6, 7, and 8, although the former one has no problem on use.

[Embodiment 2]

Figure 3:
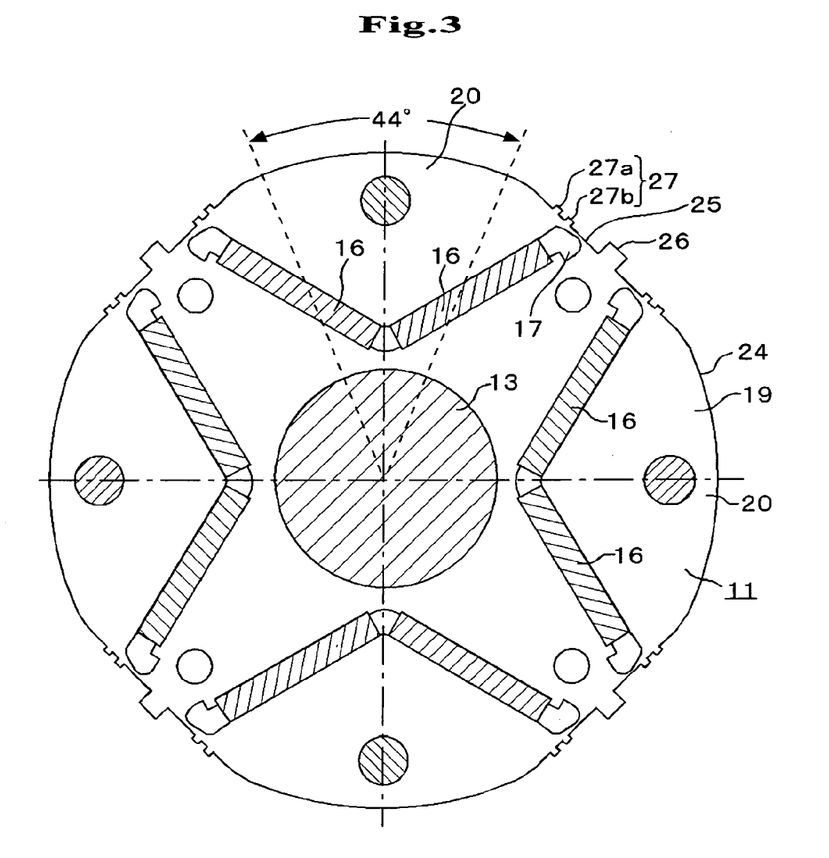
FIG. 3 shows a partially enlarged view of the rotor 11 in Embodiment 2 of the present invention.

FIG. 3 shows Embodiment 2 of the present invention in which permanent magnets 16 are arranged in a V-letter shape. When the permanent magnets 16 are arranged in a V-letter shape, the output improves, but the effect to reduce the calking torque and vibration/noise (torque ripple) which are the objects of the present invention, is hardly different from that in Embodiment 1. The other configurations are not different from those in Fig.2.

Figure 4:
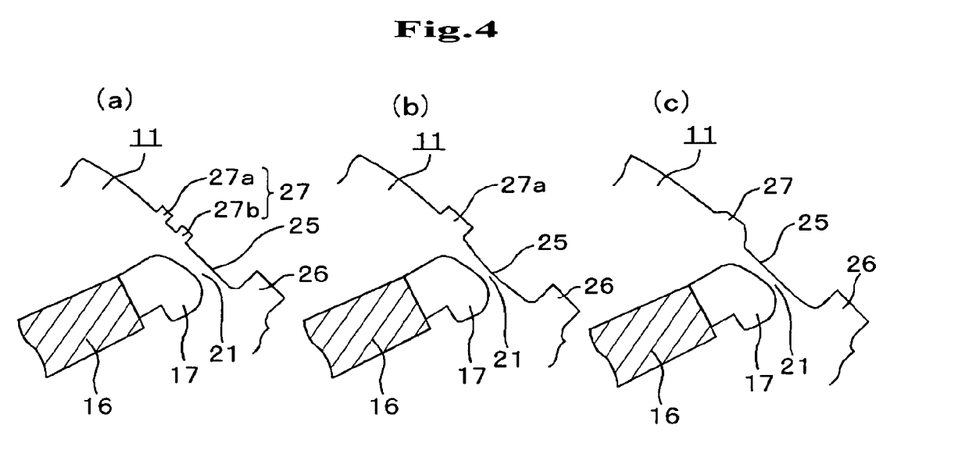

Fig.4 (a) shows an enlarged view of Fig.3 with two second protruding parts 27a and 27b. Fig.4 (b) shows an embodiment in which the one second protruding part 27a rises up sharply at both the sides and FIG. 4 (c) shows an embodiment in which the one second protruding part 27a rises up smoothly at both the sides.

Figure 11:
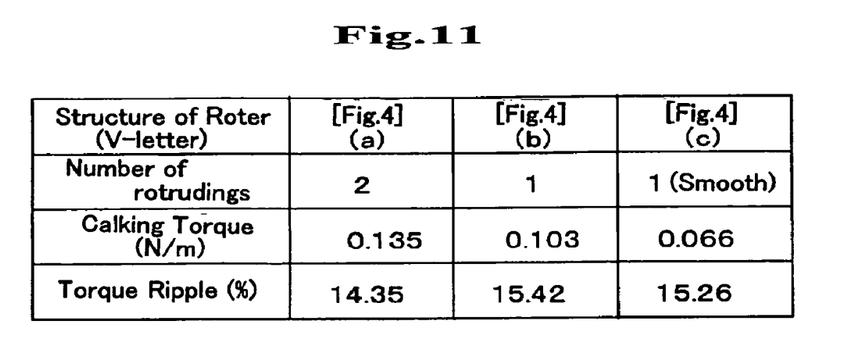
FIG. 11 shows a descriptive figure about comparison of properties between the rotor 11 for comparison and the rotor 11 of Embodiment 2 with the present invention.

The experimental action and effect of the rotor 11 (FIGS. 3 and 4) in Embodiment 2 are described in FIG. 11.

As for calking torque, the embodiment with the one second protruding part 27 which is smooth as shown in FIG. 4 (c) is the most superior. The embodiments in FIGS. 4 (a) and (b) also have the sufficient effect.

As for torque ripple, the embodiment with the two second protruding parts 27 as shown in FIG. 4 (a) is the most superior, although the embodiments in FIGS. 4 (b) and (c) also have the sufficient effect.

Although the four permanent magnets 16 in the rotor 11 are arranged at the interval of 90° in said embodiments, the arrangement is not limited to said embodiments. It can be set optimally with six permanent magnets at the interval of 60° or eight permanent magnets at the interval of 45°.

The stator 10 is not also limited to said embodiments.

The electric motor comprising as described above can be installed in a compressor. Generally, compressors are divided roughly into two types, rotary and scroll compressors.

Figure 17:
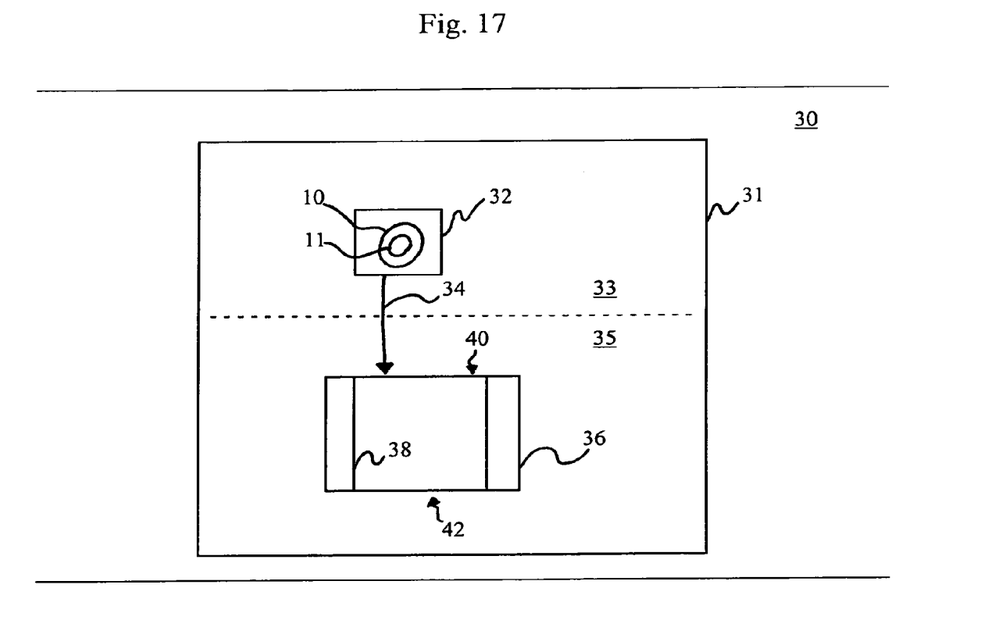
FIG. 17 shows a block diagram view of a compressor which may implement an electric motor having a rotor 11 of the present invention.

Among those, as for the rotary compressors, for example, as being written in Japanese Patent Publication No. 2002-195180 related to applications prior to the present applicant, an electric motor 32 (see FIG. 17) is arranged at the upper part 33 inside a sealed container 31 of a compressor 30 and a compression part 36 is arranged at the lower part 35. According to embodiments of the present invention, the compressor's electric motor 32 implements an embodiment of the stator 10 and rotor 11. A crank shaft 34 with an eccentric shaft part for transmitting the torque of said electric motor to said compression part 36 connects the upper and lower parts. In said compression part 36, a cylinder 38 with an inlet 40 and an outlet 42 is supported by the upper and lower bearings, and an annular roller engaged at the eccentric shaft part as being able to rotate is installed inside said cylinder 38.

As an electric motor in the rotary compressor as described above, the electric motor with the magnet embedded rotor of the present invention can be installed.

As for the scroll compressors, for example, as it is written in Japanese Patent Publication 2005-210826 related to applications prior to the present applicant, the inside of a sealed container is divided by a main frame into a compressor compartment and an electric motor compartment. An oil fraction compartment is installed at the lower part of said electric motor compartment and the electric motor with a crank shaft having a stator, rotor and pivot is installed at the lower part of said electric motor compartment. A discharge compartment is installed at the upper part of said compressor compartment, and the scroll compression compartment at the lower part. The scroll compression compartment has compression spaces formed between raps mounted at the swiveling scroll. The swiveling scroll is driven with slewing motion by action of the Oldham ring in accordance with the rotation of the crank shaft. Then, refrigerant gas is aspirated from the inlet pipe and compressed, and exhaled from the outlet. The high-pressure refrigerant gas is exhaled to the discharge compartment, led to the upper part of the electric motor compartment through the first refrigerant passage and then to the freezing cycle from the discharge pipe mounted at the upper part of the electric motor compartment.

As an electric motor in the scroll compressor as described above, the electric motor with the magnet embedded rotor of the present invention can be installed.

[Industrial Applicability]

As an electric motor in the rotary and scroll compressors, the electric motor with the magnet embedded rotor of the present invention can be installed.

The invention claimed is:

1. A magnet embedded rotor comprising:
    permanent magnets embedded in an iron core of a rotor at a fixed interval;
    a plurality of salient poles corresponding to the permanent magnets occurring in the iron core and extending to an outer surface of the rotor;
    a plurality of notched portions;
    non-magnetic parts for preventing a short circuit of magnetic flux formed at respective ends of said permanent magnets; and
    bridge parts respectively corresponding to the non-magnetic parts and being positioned radially between the corresponding non-magnetic part and a notched portion of the plurality of notched portions, each of said bridge parts having a radial length allowing for magnetic saturation;
    wherein an outer surface of each one of the plurality of salient poles occurs between a pair of notched portions of said plurality of notched portions around a circumference of the rotor,
    wherein a respective notched portion of the plurality of notched portions is positioned between adjacent salient poles, the outer surface of said each one of the salient poles being at a first rotor outer surface distance measured from a radial center of the rotor, which is greater than a second rotor outer surface distance measured from the radial center of the rotor to said respective adjacent notched portion,
    wherein each one notched portion of the plurality of notched portions extends along an arc circumferentially from a first notch end at a first salient pole outer surface to a second notch end at a second salient pole outer surface,
    wherein the magnet embedded rotor further comprises along each one of the plurality of notched portions:
        a first protruding part extending to a first height from a base of said one notched portion; and
        a second protruding part extending to a second height from the base of said one notched portion, said second height being less than said first height.

2. The magnet embedded rotor of claim 1, wherein the second protruding part along said one notched portion is one of a plurality of second protruding parts located along said one notched portion extending to a height less than said first height.

3. The magnet embedded rotor of claim 1, wherein to each side of the first protruding part and to each side of the second protruding part there is a length of said one notched portion forming an outer surface of the rotor exhibiting said second rotor outer surface distance.

4. The magnet embedded rotor of claim 1, wherein the second protruding part radially overlies one of said bridge parts effectively extending a respective radial width of at least a portion of said overlaid one bridge part.

* * * * *